United States Patent [19]

Uchiyama

[11] Patent Number: 4,580,537
[45] Date of Patent: Apr. 8, 1986

[54] AUTOMATIC SPEED CONTROL SYSTEM FOR MOTORCYCLES

[75] Inventor: Atsushi Uchiyama, Iwata, Japan

[73] Assignee: Yamaha Hatsudoki Kabushiki Kaisha, Japan

[21] Appl. No.: 604,852

[22] Filed: Apr. 27, 1984

[30] Foreign Application Priority Data

Apr. 29, 1983 [JP] Japan ................................. 58-75636

[51] Int. Cl.4 ............................................ B60K 31/08
[52] U.S. Cl. ................................... 123/352; 123/349; 123/360; 123/396; 74/489; 180/170; 180/177; 180/335
[58] Field of Search ............... 123/352, 350, 349, 360, 123/363, 378, 396, 397, 400, 399; 180/170, 175, 176, 177, 179, 335; 74/489

[56] References Cited

U.S. PATENT DOCUMENTS

| 3,099,254 | 7/1963 | Kerr | 123/352 |
| 3,332,406 | 7/1967 | Perry et al. | 123/360 |
| 4,181,103 | 1/1980 | Sturdy | 123/352 |
| 4,256,197 | 3/1981 | Kiser, Jr. | 180/335 |
| 4,359,028 | 11/1982 | Fiala | 123/350 |

Primary Examiner—Andrew M. Dolinar
Attorney, Agent, or Firm—Ernest A. Beutler

[57] ABSTRACT

Two embodiments of automatic speed control devices for motorcycles that permits release of the device from automatic mode in response to throttle closing movement of the accelerator grip. In one embodiment, the release is effective by permitting a protective sheath of a wire actuator of the throttle mechanism to move in response to throttle closing movement of the accelerator grip and this movement is employed to actuate a switch. In another embodiment, a control wire and surrounding housing afford a switch that is closed when the accelerator grip is moved in a closing direction.

16 Claims, 6 Drawing Figures

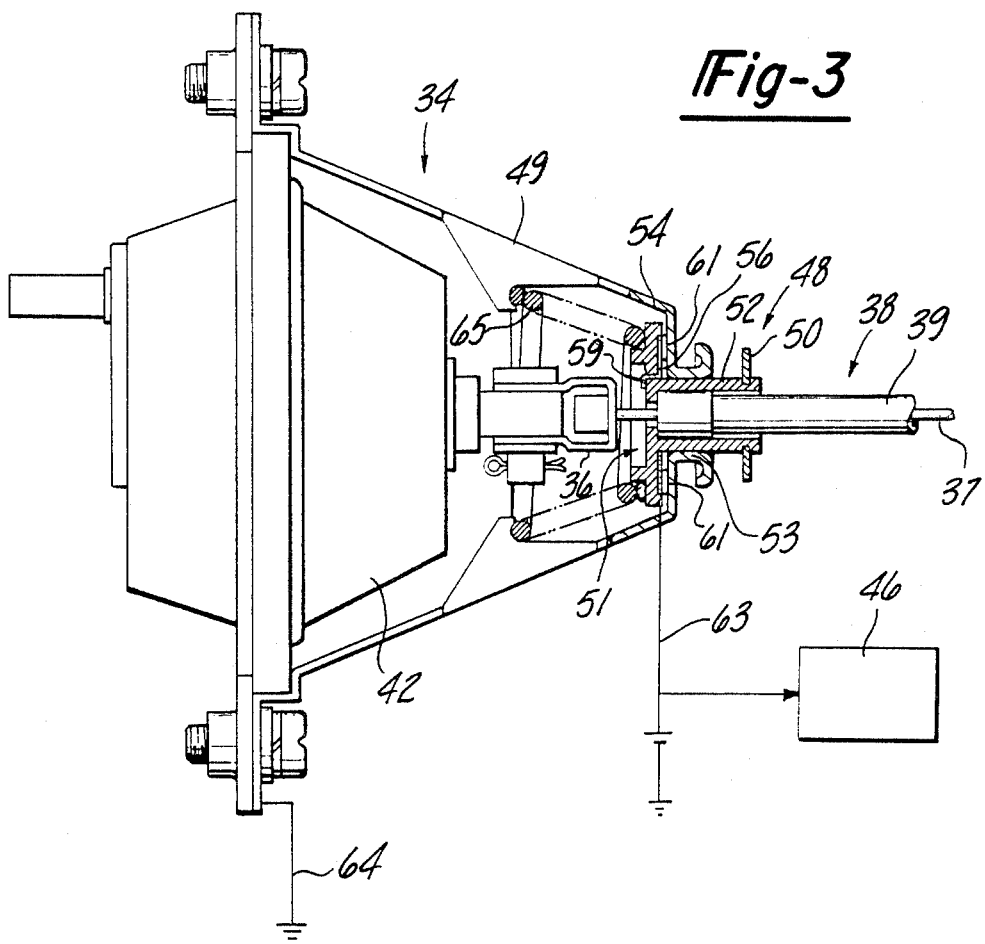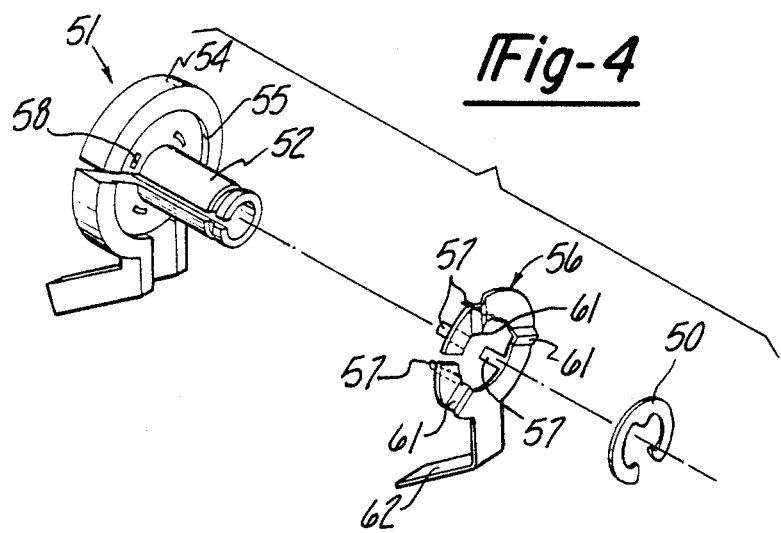

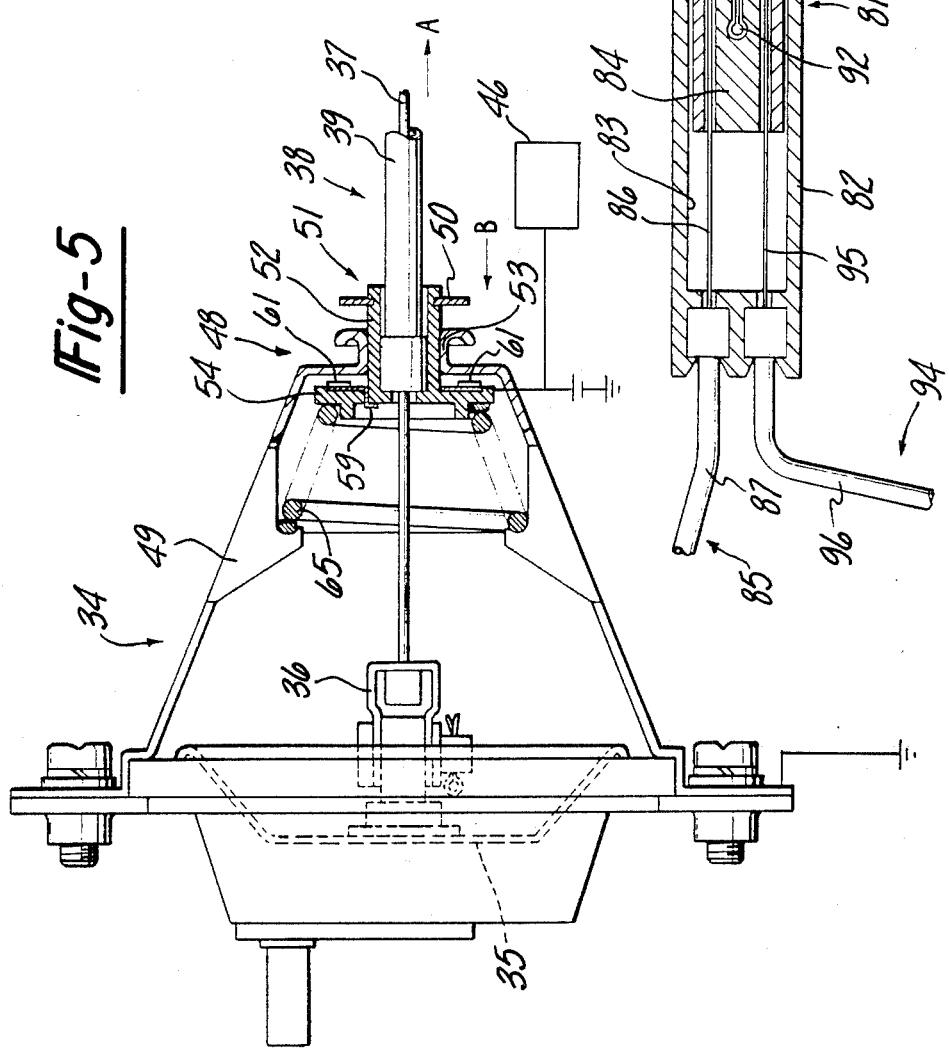

AUTOMATIC SPEED CONTROL SYSTEM FOR MOTORCYCLES

BACKGROUND OF THE INVENTION

This invention relates to an automatic speed control system for a motorcycle and more particularly to an improved automatic speed control system and an improved device for releasing the automatic speed control from its automatic mode.

The use of automatic speed controls (cruise controls) for automotive application is well known. Such devices offer a number of advantages such as the ability to maintain more accurate speed and thus save fuel and also as to relieve the driver from some of the control functions. In connection with automotive speed control devices, it has been the practice to incorporate an arrangement wherein the speed control may be deactuated from its automatic operation in response to certain operator controls. For example, the speed control can be released by the operator applying the brakes, depressing the clutch pedal or deactuating the device through the operation of a controlling switch. In automotive applications, such release mechanisms have high utility.

Many if not more of the advantages of automatic speed control devices can be enjoyed if such devices are incorporated in a motorcycle. In a motorcycle application, as with an automotive application, it is essential to provide some mechanism for releasing the speed control from its automatic mode. Although devices of the type employed in an automobile may also be utilized in connection with a motorcycle application, the automotive type of speed control releases are not particularly desirable in connection with motorcycle application.

It is, therefore, a principal object of this invention to provide an improved automatic speed control device for use with motorcycles.

It is another object of this invention to provide an automatic speed control release device particularly adapted for motorcycle application.

It is a further object of this invention to provide an automatic speed control that may be conveniently released by operator control.

Most automatic speed control devices employ a separate operator that actuates the speed controlling element of an engine independently of the manual operator so as to maintain the preset speed. The release mechanisms deactuate this automatic operator in some manner. In connection with a motorcycle, it is particularly desirable if the automatic speed control may be released by the operator's control movement of the throttle control of the motorcycle.

It is, therefore, a further object of this invention to provide an improved release device for an automatic speed control that is responsive to a change in position of the manual speed control.

SUMMARY OF THE INVENTION

A first feature of this invention is adapted to be embodied in an automatic speed control for the internal combustion engine of a motorcycle or the like comprising a speed control element for the engine for controlling its speed, a manual speed control operatively connected to the engine speed control element for operator control of the engine speed and an automatic speed control that is operatively connected to the engine speed control element for automatically maintaining a preset engine speed. In accordance with this feature of the invention, means are provided for releasing the automatic speed control when the manual speed control is moved in a speed reducing direction.

Another feature of this invention is adapted to be embodied in a switch mechanism for deactivating an automatic speed control or the like for an engine speed control element. The automatic speed control includes a wire actuator comprising a wire that is operatively connected to the engine speed control element for controlling the position of the engine speed control element. A protective sheath encircles at least a portion of the wire and means retain the protective sheath in position. In accordance with this feature of the invention, means permit movement of the protective sheath upon the application of a control pressure to the engine speed control element. Switching means are responsive to the movement of the protective sheath for deactivating the automatic speed control or the like.

BRIEF DESCRIPTION OF THE DRAWINGS

FIG. 3 is a still further enlarged view showing a portion of the automatic speed control.

FIG. 4 is an exploded perspective view showing components of the mechanism.

FIG. 5 is an enlarged view, with portions broken away, in part similar to FIG. 3, showing another mode of operation.

FIG. 6 is an enlarged cross-section view showing a portion of an automatic speed control mechanism constructed in accordance with another embodiment of the invention.

DETAILED DESCRIPTION OF THE PREFERRED EMBODIMENTS

Figure 1:
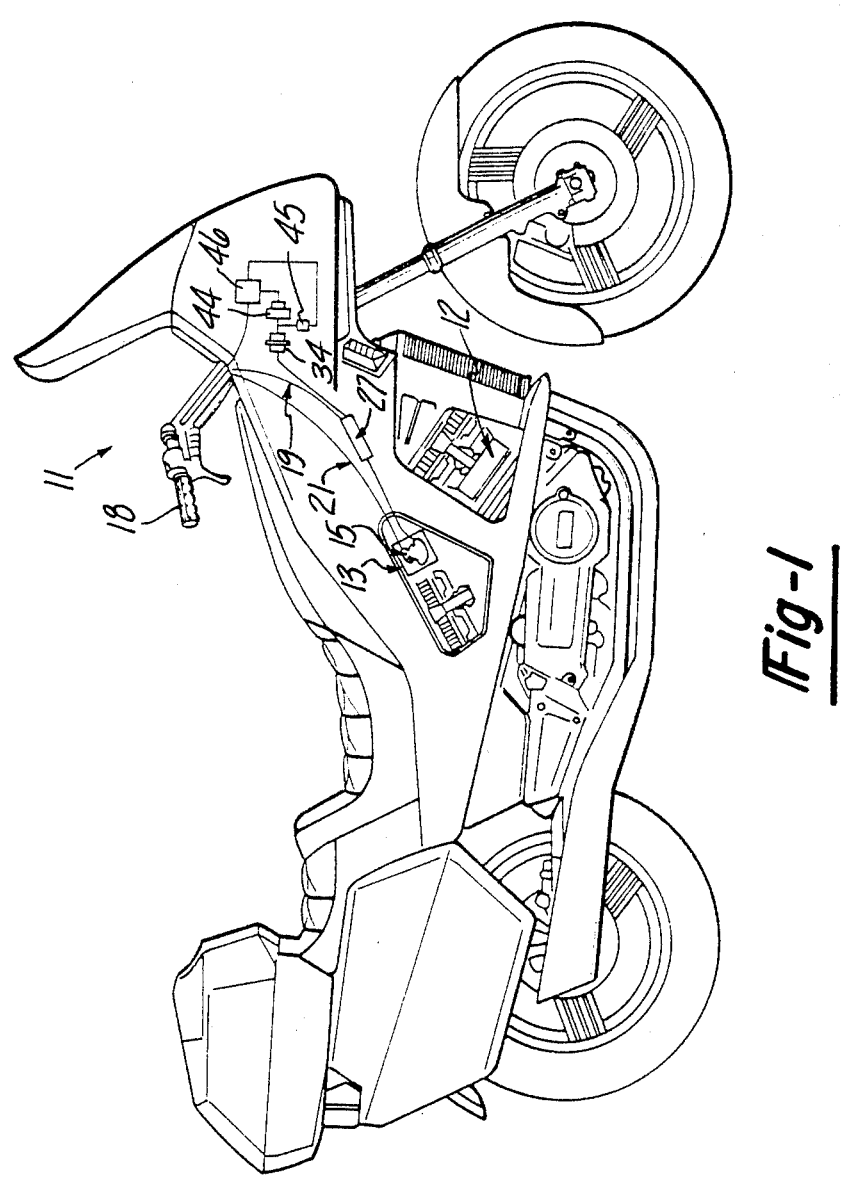
FIG. 1 is a side elevational view of a motorcycle embodying an automatic speed control constructed in accordance with the invention.

Referring first to the embodiment of FIGS. 1 through 5, a motorcycle having an automatic speed control constructed in accordance with this embodiment is identified generally by the reference number 11. The motorcycle 11 is powered by an internal combustion engine, indicated generally by the reference number 12 and which may be of any known type. The engine 12 is provided with a speed controlling element, indicated generally by the reference number 13 which, in the illustrated embodiment, comprises one or more carburetors. The carburetors 13 have throttle valves 14 that are actuated by means of a throttle actuating mechanism 15 that includes a link or cam 16 that is affixed for rotation with a shaft 17 to which the throttle valve 14 is affixed in a known manner.

The throttle valve 14 is adapted to be positioned manually under the control of an accelerator grip 18 that is rotatably supported by one of the handlebars of the motorcycle 11 in a known manner. The accelerator grip 18 operates a throttle opening wire actuator mechanism, indicated generally by the reference number 19 and a throttle closing wire actuator mechanism, indicated generally by the reference number 21. The throttle closing wire actuator 21 includes a wire element 22 that is affixed at one end to the accelerator grip 18 and at its other end to the throttle lever 17 in known manners. A major portion of the length of the closing wire 22 is encircled by a protective sheath 23 that is fixed at one end to a housing 24 adjacent the accelerator grip 18 at its other end to the carburetor 13 in known manners.

Figure 2:
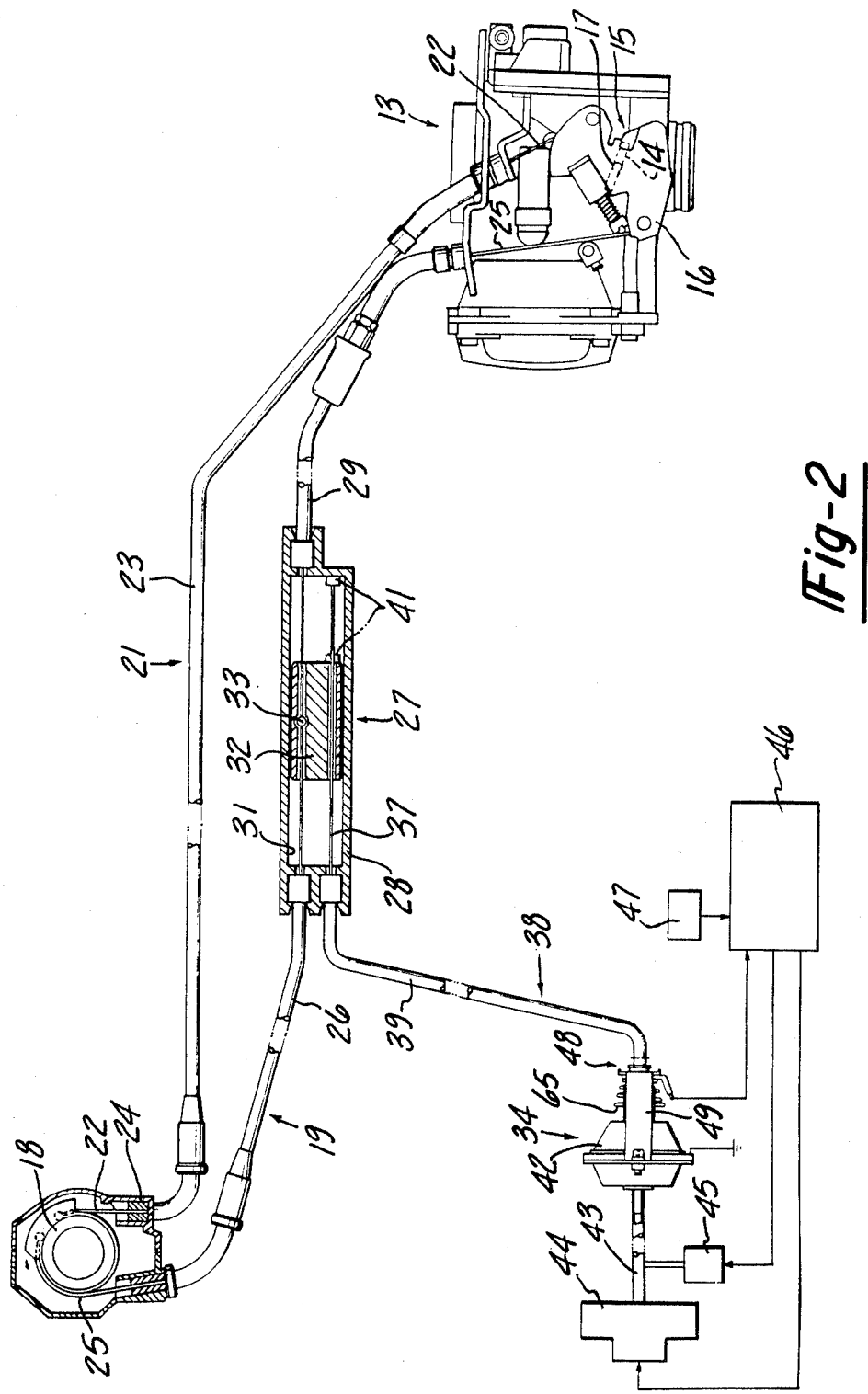
FIG. 2 is an enlarged view showing the speed controlling mechanism with portions broken away and other portions shown schematically.

In a somewhat similar manner, the throttle opening wire actuator 19 includes a wire element 25 that is connected at one of its ends to the accelerator grip 18 and at its other end to the throttle lever 16 in a known manner. The connection between the wires 22 and 25 and the throttle lever 16 are on opposite sides of the shaft 17 so that a tensioning of one of the wires will cause rotation of the throttle lever 16 in one direction and a tensioning of the other of the wires will cause rotation of the throttle lever 16 in the opposite direction. Tensioning of the wire 25 causes rotation of the throttle lever 16 in a clockwise direction as shown in FIG. 2 so as to accomplish throttle opening. Tensioning of the wire 26 will cause rotation of the throttle lever 16 in a counterclockwise direction so as to cause closing of the throttle valve 14.

In a conventional motorcycle throttle arrangement, the throttle opening wire 25 will be encircled by an uninterrupted protective sheath that is fixed at its opposite ends to the bracket 24 and carburetor 13 in a manner similar to the attachment of the protective sheath 23 of the throttle closing wire actuator 21. In accordance with the invention of this embodiment, however, the protective sheath is divided into a first portion 26 that is fixed at one end to the bracket 24 and at its other end to an actuating device, indicated generally by the reference numeral 27. The actuating device 27 includes a cylindrical housing 28 to which the opposite end of the protective sheath portion 26 is affixed. The protective sheath for the throttle opening wire actuator 19 includes a second portion 29, one end of which is connected to the housing 28 and the other end of which is affixed to the carburetor 13 in a known manner.

The housing 28 has a generally cylindrical bore 31 that defines an internal cavity in which a slide member 32 is supported for reciprocation. The throttle opening wire 25 is affixed to the slide member 32 by means of a ferrule or the like 33 so that movement of the wire 25 will cause reciprocation of the slide member 32 in the bore 31. In this embodiment, however, the wire 25 is continuous between the accelerator grip 18 and the throttle lever 16.

The motorcycle 11 is also provided with an automatic speed control that includes an actuating device, indicated generally by the reference number 34. As will become apparent, the actuating device 34 comprises a vacuum motor that includes a diaphragm 35 to which an actuating rod 36 is affixed. The actuating rod 36 is connected to one end of a wire 37 of an automatic wire actuator, indicated generally by the reference numeral 38. An automatic wire actuator 38 includes a protective sheath 39 that encircles a portion of the wire 37 and which is affixed at one of its ends to the housing 28 in an appropriate manner. The wire 37 extends into the interior cavity 31 of the actuating device 27 and passes through a bore in the slider 32. The inner end of the wire 37 has affixed to it a ferrule 41 that is adapted to engage the slider 32 and move the slider 32 and the throttle opening wire 25 in a direction so as to control the throttle valve 14 automatically.

The actuator 34 has its diaphragm 35 contained within an outer housing 42 that defines a vacuum chamber on one side of the diaphragm 35. This chamber is communicated by a pipe 43 to a vacuum pump 44 that is operated when the automatic speed control device is actuated so as to hold the diaphragm 35 and automatic throttle actuating wire 37 in the desired position so as to maintain the preset speed of the motorcycle 11. The amount of vacuum generated is controlled by means of a bleed valve 45 which is, in turn, controlled by an automatic controller 46 so as to position both the bleed valve 45 and to actuate the vacuum pump 44 under appropriate control signals. The controller 46 also receives an input from a vehicle speed sensor 47 so that the preset speed will be accurately maintained. The construction of the controller 46 and its interrelationship with the vacuum pump 44 and bleed valve 45 is shown schedmatically in the figures since this construction may be of any known type.

A release signal generator, indicated generally by the reference numeral 48, is provided by means of a connection between one end of the protective sheath 39 and a bracket 49 that is affixed to the actuator housing 42 in any known manner. The release signal generator 48 includes a holder body, indicated generally by the reference numeral 51, which has a cylindrical portion 52 in which one end of the protective sheath 39 is staked. The cylindrical portion 52 is slidably supported by means of a guide 53 formed by the outer ends of the bracket 49. A snap ring 50 is affixed to the outer end of the cylindrical portion 52 so as to limit the degree of inward movement of the holder body 51 relative to the bracket 49.

The cylindrical portion 52 of the holder body 51 terminates at an enlarged portion 54 that is provided with a recess 55 that encircles the base of the cylindrical portion 52. A contact, indicated generally by the reference numeral 56, has a first generally annular shaped portion that is received within the recess 55. The contact 56 has a number of inwardly extending tangs 57 that are adapted to extend through recesses 58 formed in the holder body 51 and which can be turned over as at 59 so as to affix the contact 56 to the holder body 51. The forward portion of the member 56 is formed with a number of annularly spaced projections 61 that are adapted to engage the bracket 49 so as to provide a contact between the bracket 49 and the contact 56.

The contact 56 is provided with a tang 62 that is connected through a suitable circuit, indicated by the line 63, to the controller 46. In a similar manner, the bracket 49 is grounded in an appropriate manner, as indicated by the line 64. The circuit is such that when the contact member 56 is held in engagement with the bracket 49, the circuit will be closed and the controller 46 will be operative. If, however, the contact member 56 moves out of contact with the bracket 49, the circuit will be opened and the controller 46 will be deactuated. A coil compression spring 65 is engaged at one end with the bracket 49 and at the other end with the holder member 51 so as to normally urge the contact 56 into engagement with the bracket 49.

OPERATION

During non-automatic speed control operation, the speed of the engine 12 is set by the operator rotating the accelerator grip 18 to the desired position. If the accelerator grip 18 is rotated in a clockwise direction as seen in FIG. 2, a tension will be placed on the accelerator opening wire 25 and the link 16 will be rotated in a counterclockwise direction so as to open the throttle valve 14 to the desired position. If the accelerator grip 18 is rotated in the opposite direction, a tension will be placed on the accelerator closing wire 22 and the lever 16 and throttle valve 14 will be rotated in an opposite, throttle closing condition. During this movement, the slider 32 slides freely in the housing 31 and the ferrule 41 of the automatic control wire 37 will be spaced from the slider 32.

When the automatic speed control device 38 is set, the controller 46 will operate the vacuum pump 46 and bleed valve 45 in response to the signal from the speed control 47 so as to move the diaphragm 35 to the approprirate position to maintain the desired speed. As the diaphragm 35 moves, the rod 36 will cause a tensile force on the automatic control wire 37 to bring the ferrule 41 into engagement with the slider 32 so as to move the slider 32 and the throttle opening wire 25 to the appropriate position so as to rotate the lever 16 and the throttle valve 14 to a position to maintain the desired speed.

If the operator at any time wishes to release the automatic speed control 38, he need merely take the accelerator grip 18 and rotate it in a throttle closing direction (clockwise as viewed in FIG. 2). Such rotation will cause a tension on the throttle closing wire 22 so as to urge the lever 16 and throttle valve 14 in a counterclockwise direction so as to close the throttle valve 14. This movement exerts a tensile force on the wire 25 which, in turn, exerts a force on the slider 32 tending to move it to the right as shown in FIG. 2. This causes a tensile force to be exerted on the automatic control wire 37 which is, on the other hand, resisted by the operation of the diaphragm 35. The direction of this force is indicated by the arrow A in FIG. 5. Therefore, a reactive force is exerted on the protective sheath 39 in the direction of the arrow B which force, if sufficient to overcome the action of the spring 65, will cause the holder 51 to slide in the guide provided by the bracket flanges 53 and, therefore, the contact 56 will move out of engagement with the housing 49 and open the circuit to deactivate the controller 46. Thus, the automatic device will be released and the operation of the vacuum pump will be terminated so that the device is returned to manual control.

In the embodiment of FIGS. 1 through 5, the releasing force has been sensed by relative movement between the ends of the wire actuator and its protective sheath of the automatic control wire 38 where it is connected to the automatic speed control actuator 34. It is to be understood that this relative movement may be sensed at the opposite end or, for that matter, between the ends of the wire and protective sheath of any of the control elements through suitable means so that the automatic speed control can be actuated in response to throttle closing rotation of the accelerator grip 18. Said a slightly different way, the deactuating switch may be associated with any end of any protective sheath of the various wire actuators of the manual and automatic throttle operating mechanism so long as it is actuated by movement in the appropriate, relative direction.

EMBODIMENT OF FIG. 6

In the embodiment of FIGS. 1 through 5, a control wire is provided for opening the throttle valve of the engine and a separate control wire was provided for closing the throttle valve of the engine. This invention is also adapted to be used in conjunction with throttle valve controlling arrangement wherein only a throttle opening control wire is provided and the throttle valve is urged toward its closed position by a return spring. An actuating device, constructed in accordance with this embodiment, is shown in FIG. 6 and is identified generally by the reference numeral 81. Like the embodiment of FIGS. 1 through 5, the actuating device 81 includes a cylindrical housing 82 having a bore 83 in which a slider 84 is slidably supported.

A throttle opening control wire actuator is indicated generally by the reference numeral 85 and includes a control wire 86 and a surrounding protective sheath 87. One end of the wire 86 is connected to the accelerator grip in the manner as described in conjunction with the embodiment of FIGS. 1 through 5. Because of the similarity of this construction, it is not illustrated in connection with this embodiment. The opposite end of the wire 86 extends into the bore 83 and passes through an enlarged opening in the slider 84. A ferrule 88 is affixed to the inner end of the wire 86 and is adapted to engage one side of the slider 84 so as to move the slider 84 toward the left as seen in FIG. 6, which is the throttle opening direction.

Unlike the previous embodiment, the wire 86 does not pass completely through the actuator 81 but terminates within it. A throttle control wire actuator assembly, indicated generally by the reference numeral 89, includes a wire 91 that has a headed portion 92 that is staked to the slider 84 for simultaneous movement with it. The wire 91 is encircled by a protective sheath 93 which has one of its ends affixed to the actuator housing 82. The opposite end of the wire 91 is connected to the throttle valve of the carburetor or of the speed controlling device of the associated engine for opening (speed increasing) movement. As has been previously noted, an associated return spring is provided for urging the throttle valve or control device to its closed or speed reducing condition. Since this construction is well known, it has not been illustrated.

An automatic control wire actuator, indicated generally by the reference numeral 94, is also provided. The automatic wire actuator 94 includes a wire 95 that is connected at one of its ends (not shown) to an automatic speed control device of the type employed in the embodiment of FIGS. 1 through 5 or any other suitable type. The wire 95 is encircled by a protective sheath 96 which, unlike the embodiment of FIGS. 1 through 5, has its not shown end rigidly affixed relative to the automatic actuator. The opposite end of the wire sheath 96 is affixed to the housing 82 in an appropriate manner. The wire 95 passes through a suitable opening in slider 84 so as to be slidable connected to it. A ferrule 97 is affixed to the inner end of the control wire 95 and is adapted to actuate the slider 84 to move it in a throttle opening direction. If the wire 95 is moved in the opposite, right hand direction, the throttle return spring (not shown) will cause the slider 84 to follow the ferrule 97 and achieve throttle closing.

This embodiment operates in the following manner. As the accelerator grip is rotated in a throttle opening direction, the throttle opening control wire 86 will be drawn toward to left and the ferrule 88 will engage the slider 84 so as to also move it to the left. This motion is transmitted through the connection 92 to the throttle controlling wire 91 so as to move the throttle valve associated with it in an opening direction. If the throttle opening wire 86 is moved to the right as shown in FIG. 6, the return spring will cause the slider 84 to follow this movement of the throttle opening wire 86. During this movement, and assuming that there is no automatic operation, the automatic control wire 95 will be maintained so that its ferrule 97 is in contact with the housing 82.

During automatic operation, the wire 95 will be actuated by the vacuum motor and will cause its ferrule 97 to engage the slider 84 and to operate the slider 84. This movement will be permitted because of the lost motion connection that is afforded between the wire 86 and the slider 84.

In order to provide automatic deactivation in this embodiment, the wire 86 and specifically the ferrule 88 is in circuit with an appropriate circuit as is the housing 82. If the acelerator grip is moved in a throttle closing position sufficiently, the ferrule 88 will contact the housing 82 and close this circuit, which closure is utilized to deactivate the automatic speed control in any appropriate method. Therefore, like the embodiment of FIGS. 1 through 5, the automatic speed control can be deactivated by rotating the accelerator grip in a throttle closing direction.

It should be readily apparent that the two described embodiments are highly effective in providing automatic speed control for a motorcycle and in which the automatic mode may be conveniently deactivated by moving the accelerator grip in a throttle closing direction. Although two embodiments of the invention have been illustrated and other variations described, various other changes and modifications may be made without departing from the spirit and scope of the invention, as defined by the appended claims.

I claim:

1. In an automatic speed control for the internal combustion engine of a vehicle comprising a speed control element for the engine for controlling its speed, a manual speed control operatively connected to said engine speed control element for operator control of the engine speed, and an automatic speed control operatively connected to the engine speed control element and operable between an automatic condition for automatically maintaining a preset engine speed and an off condition wherein said automatic speed control is not operative for automatically maintaining preset engine speed, the improvement comprising means for operating said automatic speed control from its automatic condition to its off condition when said manual speed control is moved in a speed reducing direction.

2. In an automatic speed control as set forth in claim 1 wherein the means for connecting at least one of the speed controls with the speed control element comprises a wire actuator.

3. In an automatic speed control as set forth in claim 2 wherein the wire actuator comprises a wire and a surrounding protective sheath and the means for operating the automatic speed control to its off condition is responsive to relative movement between said wire and said protective sheath.

4. In an automatic speed control as set forth in claim 3 wherein the means for operating the automatic speed control to its off condition is responsive to movement of the protective sheath.

5. In an automatic speed control as set forth in claim 4 wherein the means responsive to the movement of the protective sheath comprises means for biasing the protective sheath into a preset position and switch means responsive to movement of the protective sheath from the preset position upon yielding of the biasing means.

6. In an automatic speed control as set forth in claim 3 wherein the means for operating the automatic speed control to its off condition is responsive to movement of the wire.

7. In an automatic speed control as set forth in claim 6 wherein the wire is slidably supported in a housing and the means responsive comprises a switch operative upon contact of the wire with the housing for deactivating the speed control.

8. In an automatic speed control as set forth in claim 1 wherein the manual speed control comprises a rotatably supported accelerator grip and the means for operatively connecting the manual speed control with the engine speed control element comprises a first wire actuator for operating the speed control element in a throttle opening direction and a second wire actuator for operating the engine speed control in a throttle closing direction, there further comprising an actuating device interposed in the throttle opening mechanism consisting of a housing through which a throttle opening wire passes, a slider slidably supported within said housing and affixed to said throttle opening wire, the automatic speed control operative connection comprising an automatic wire actuator having a wire and a surrounding protective sheath, said wire of said automatic actuator being connected to said slider by means of a lost motion connection and the means for operating the automatic speed control to its off condition being responsive to movement of the protective sheath of said automatic wire actuator.

9. In an automatic speed control as set forth in claim 1 wherein the manual speed control comprises a rotatably supported accelerator grip and the means for connecting the accelerator grip to the engine speed control comprises a wire actuator having a wire element and a surrounding protective sheath, there being further comprising an actuating element comprising a housing slidably supporting a slider, the other end of said wire being connected to said slider by means of a lost motion connection, said wire being engageable with said housing upon a predetermined throttle closing movement, and the means for operating the automatic speed control to its off condition comprising a switch operated upon contact of said wire with said housing.

10. In a switch mechanism for deactivating an automatic speed control for an engine speed control element comprising a wire actuator comprising a wire operatively connected to said speed control element for controlling the position of said element, a protective sheath encircling at least a portion of said wire, and means for retaining said protective sheath in position, the improvement comprising means for permitting movement of said protective sheath upon the application of a control pressure to said engine speed control element, and switch means responsive to movement of said protective sheath for deactivating said automatic speed control or the like.

11. In a switch mechanism as set forth in claim 10 wherein the means for retaining the protective sheath in position comprises biasing spring means operative to hold the protective sheath in position until a predetermined force is exerted.

12. In a switch mechanism as set forth in claim 11 wherein the switch means comprises a first element fixed relative to the protective sheath and a second element fixed against movement.

13. An automatic speed control for the internal combustion engine of a vehicle comprising a speed control element for the engine for controlling its speed, a manual speed control, means providing a closed loop operative connection between said manual speed control and said engine speed control element for operator control of the engine speed in response to movement of said manual speed control in either the throttle opening or throttle closing direction, said closed loop operative connection comprising a throttle closing control wire and a throttle opening control wire each operatively connected at its respective ends to the respective control, an automatic speed control operatively connected by a wire actuator to the engine speed control element for automatically maintaining a preset engine speed, the operative connection between said automatic speed control and said engine speed control element including means for permitting movement of said engine speed control in at least one direction relative to said automatic speed control.

14. In an automatic speed control as set forth in claim 13 wherein the means for permitting movement of the engine speed control relative to the automatic speed control comprises a lost motion connection between the wire actuator of the automatic speed control and the engine speed control element.

15. In an automatic speed control as set forth in claim 13 wherein the manual speed control comprises a rotatably supported accelerator grip.

16. In an automatic speed control as set forth in claim 15 wherein the closed loop operative connection further comprises an actuating element interposed in the throttle opening connection comprising a housing slidably supporting a slider, one end of said automatic wire actuator being connected to said slider by means of a lost motion connection.

* * * * *